(12) United States Patent
Hsu et al.

(10) Patent No.: US 7,127,316 B2
(45) Date of Patent: Oct. 24, 2006

(54) METHOD AND SYSTEM FOR ESTIMATING MANUFACTURING TARGET BIAS

(75) Inventors: Yen-Pu Hsu, Jhongli (TW); Cheng Hsien Wei, Nantou (TW); Mei-Jen Wu, Hsin-Chu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 10/994,078

(22) Filed: Nov. 19, 2004

(65) Prior Publication Data

US 2006/0111803 A1 May 25, 2006

(51) Int. Cl.
*G06F 19/00* (2006.01)

(52) U.S. Cl. ............ 700/109; 700/110; 700/121; 700/176; 438/14

(58) Field of Classification Search ............ 700/52, 700/95, 96, 108, 109, 110, 121, 174, 176; 702/83, 24, 85, 105; 438/14
See application file for complete search history.

(56) References Cited

U.S. PATENT DOCUMENTS

| | | | |
|---|---|---|---|
| 6,480,794 B1 | 11/2002 | Hsieh et al. ............ 702/84 |
| 6,514,673 B1 | 2/2003 | Lin et al. ............ 430/317 |
| 6,615,093 B1 * | 9/2003 | Chung et al. ............ 700/121 |
| 6,780,656 B1 * | 8/2004 | Muradian et al. ............ 438/14 |
| 6,925,347 B1 * | 8/2005 | Miller et al. ............ 700/121 |
| 6,928,628 B1 * | 8/2005 | Seligson et al. ............ 438/14 |

* cited by examiner

*Primary Examiner*—Leo Picard
*Assistant Examiner*—Charles Kasenge
(74) *Attorney, Agent, or Firm*—Thomas, Kayden, Horstemeyer & Risley

(57) ABSTRACT

A computer implemented method for estimating manufacturing target bias for products in manufacturing tools. The method first establishes a first data set according to manufacturing target bias history based on a correlation with tools used. The manufacturing tools comprise a first manufacturing tool and other manufacturing tools. Next, a testing operation is executed for a predicted product in the first manufacturing tool to obtain a first predicted manufacturing target bias. Finally, manufacturing target bias of the predicted product in the other manufacturing tools is calculated according to the first data set and the first predicted manufacturing target bias.

21 Claims, 4 Drawing Sheets

METHOD AND SYSTEM FOR ESTIMATING MANUFACTURING TARGET BIAS

BACKGROUND

The present invention relates to manufacturing control technology and in particular to a method for estimating manufacturing target bias.

In high-technology manufacturer, such as in integrated circuit (IC) product manufacturer, before quantity production, testing operation for products must be executed, that is a pilot run, for examination. An important object of the testing operation is acquisition of a manufacturing target bias for the product. Manufacturing target bias accommodates hardware limitations of manufacturing tools. For example, if a target width of an IC product is 130 nanometers, and testing operations in a specific manufacturing tool show 132 nanometers, thus, a manufacturing target bias is designated as 2 nanometers for the tool, which is then applied in the specific tool for ongoing production.

Accurate manufacturing target bias is an essential requirement for product manufacturing, especially for non-reworkable manufacturing tools. In a non-reworkable manufacturing tool, the manufacturing process operated therein cannot be repeated, such as etching. Conventionally, manufacturing target bias must be established for each tool even tools operating in the same manufacturing conditions, i.e. using the same recipe for the same IC product. Manual preparations must take place before ongoing production, a time-consuming and human resource intensive requirement.

FIG. 1 is a diagram of a pilot run in IC product manufacture, in which, three specific etching tools use the same recipe for an IC product, and each manufacturing tool has three chambers. The product, accordingly, must undergo a pilot run in each tool and each chamber to generate manufacturing target bias, a total of nine trials. Generally, the number of the manufacturing tools in an IC product manufacturing factory is large, such that the pilot runs for a product entail a complicated process.

U.S. Pat. No. 6,480,794 discloses a method for allocating products to be tested to machines on a manufacturing line, providing a standard test time with minimized total test time, forming a supply demand matrix table for products and machines to which the products are to be allocated, determining the grid location with a minimum testing time Tij. The method does not disclose estimation of manufacturing target bias, despite utilizing a pilot run. Other inventions are concerned with specific manufacturing processes, such as U.S. Pat. No. 6,514,673, which discloses a simple method for calculating the optimum amount of HDP deposited material to be removed during CMP (without introducing dishing), but, is not applicable to the mentioned manufacturing target bias estimation problem.

SUMMARY

Accordingly, an object of the invention is to provide a systematic method to estimate manufacturing target bias in manufacturing tools prior to full production.

To achieve the foregoing and other objects, the invention discloses a computer implemented method for estimating manufacturing target bias in manufacturing tools. First, a first data set is established according to manufacturing target bias history for products based on a correlation with tools used. The correlation applies like manufacturing conditions. The manufacturing tools comprise a first manufacturing tool and other manufacturing tools. Next, a testing operation for a predicted product is executed in the first manufacturing tool to obtain a first predicted manufacturing target bias. Finally, manufacturing target bias for the predicted product in the other manufacturing tools is calculated according to the first data set and the first predicted manufacturing target bias.

BRIEF DESCRIPTION OF THE DRAWINGS

The present invention can be more fully understood by reading the following detailed description and examples with references made to the accompanying drawings, wherein.

DESCRIPTION

Figure 1:
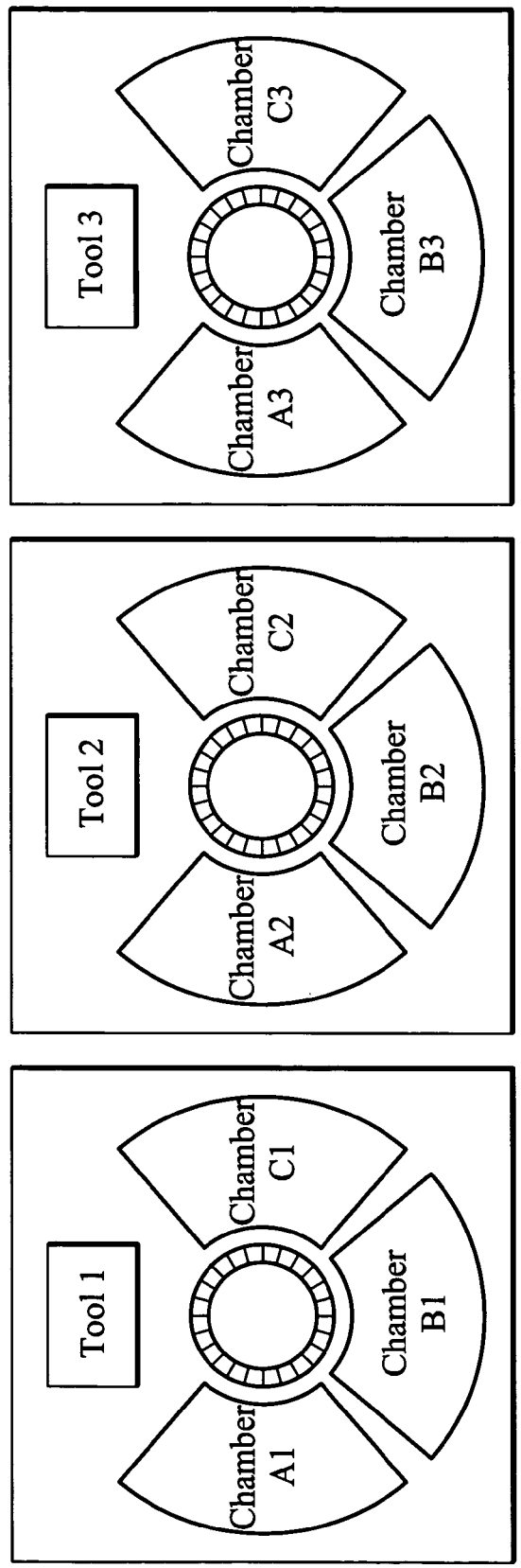
FIG. 1 is a diagram of a pilot run in IC product manufacture.

As summarized above, the present invention discloses a computer implemented method for estimating manufacturing target bias for manufacture. First, a first data set is established according to manufacturing target bias history for products based on a correlation with tools used. The correlation applies like manufacturing conditions. In IC product manufacture, the correlation applies to the same recipe. The manufacturing tools comprise a first manufacturing tool and other manufacturing tools.

The first data set can be implemented by a two-dimensional matrix, and established using the following formula:

$$d_{ij}[t] = \frac{\sum_{n=0}^{k} \{(1-w)^n \times d_{ij}[t-(n+1)]\}}{\sum_{n=0}^{k} (1-w)^n}$$

Here, w is a predetermined weight, k is a predetermined iteration count to express look back history, d is the manufacturing target bias, present or historical, i is a raw number of the first data set, j is a column number of the first data set, and t is timing count. Practically, i may represent chambers and j may represent products.

Next, a testing operation is executed for a predicted product in the first manufacturing tool to obtain a first predicted manufacturing target bias.

Finally, manufacturing target bias of the predicted product in the other manufacturing tools is calculated according to the first data set and the first predicted manufacturing target bias.

The calculation is accomplished by the following steps. First, manufacturing target bias of the predicted product in the other manufacturing tools is initialized according to the first predicted manufacturing target bias. In one embodiment, the initialization applies the manufacturing target bias of the predicted product in the other manufacturing tools corresponding to the first predicted manufacturing target bias. In other words, the initialization considers product over manufacturing tool due to its stronger influence in manufacture. The initialization can also be implemented using other applications.

A second data set is obtained according to the first data set, the first predicted manufacturing target bias, and the initialized manufacturing target bias. The manufacturing target bias of the predicted product in the other manufacturing tools is finally calculated according to the second data set.

The second data set can be implemented by a two-dimensional matrix. The manufacturing target bias of the predicted product in the other manufacturing tools is calculated by the following formula:

$$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

Here, m is a sum of the product and the predicted product, n is the number of manufacturing tools, k is an iteration count to express look back history, i is a row number of the second data set, j is a column number of the second data set, and d is manufacturing target bias. Here, again, practically i may represent chambers and j may represent products.

If the calculated manufacturing target bias is less than a tolerance of the manufacturing tools, the calculation is terminated. For example, if a tolerance of a specific manufacturing tool for etching is 0.4 nanometers, calculation less than 0.4 nanometers is inapplicable.

Thus, the computer implemented method for estimating manufacturing target bias in manufacturing tools requires only one testing operation to estimate manufacturing target bias for products in other manufacturing tools, reducing wasted operating time and resources.

A machine-readable storage medium for storing a computer program providing a computer implemented method for estimating manufacturing target bias for products in manufacturing tools is also disclosed, comprising the previously mentioned steps.

A system for estimating manufacturing target bias for products in manufacturing tools is further provided. The system comprises a first data set module, a testing operation module, and a manufacturing target bias calculation module.

The first data set module establishes a first data set according to manufacturing target bias history for products based on a correlation with tools used. Here, again, the correlation applies like manufacturing conditions. The manufacturing tools comprise a first manufacturing tool and other manufacturing tools.

The first data set can be implemented by a two-dimensional matrix. The first data set, i.e. the two-dimensional matrix, is established using the following formula:

$$d_{ij}[t] = \frac{\sum_{n=0}^{k} \{(1-w)^n \times d_{ij}[t-(n+1)]\}}{\sum_{n=0}^{k} (1-w)^n}$$

In which, w is a predetermined weight, k is a predetermined iteration count to express look back history, d is the manufacturing target bias, present or historical, i is a raw number of the first data set, j is a column number of the first data set, and t is timing count. Practically, i may represent chambers and j may represent products.

The testing operation module executes a testing operation of a predicted product in the first manufacturing tool to obtain a first predicted manufacturing target bias.

The manufacturing target bias calculation module calculates manufacturing target bias of the predicted product in the other manufacturing tools. The manufacturing target bias calculation module comprises an initialization module, a second data set obtaining module, and a predicted manufacturing target bias calculation module.

The initialization module initializes manufacturing target bias of the predicted product in the other manufacturing tools according to the first predicted manufacturing target bias. In one embodiment, the initialization module may designate the manufacturing target bias of the predicted product in the other manufacturing tools as the first predicted manufacturing target bias. The second data set obtaining module calculates a second data set according to the first data set, the first predicted manufacturing target bias, and the initialized manufacturing target bias. The predicted manufacturing target bias calculation module calculates the manufacturing target bias of the predicted product in the other manufacturing tools according to the second data set. The second data set may be implemented as a two-dimensional matrix. The predicted manufacturing target bias calculation module calculates the manufacturing target bias according to the formula:

$$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

Here, m is a sum of the product and the predicted product, n is the number of manufacturing tools, k is an iteration count to express look back history, i is a row number of the second data set, j is a column number of the second data set, and d is manufacturing target bias. Here, again, practically i may represent chambers and j may represent products. The predicted manufacturing target bias calculation module terminates the calculation if the predicted manufacturing target bias is less than a tolerance of the manufacturing tools.

Figure 2A:
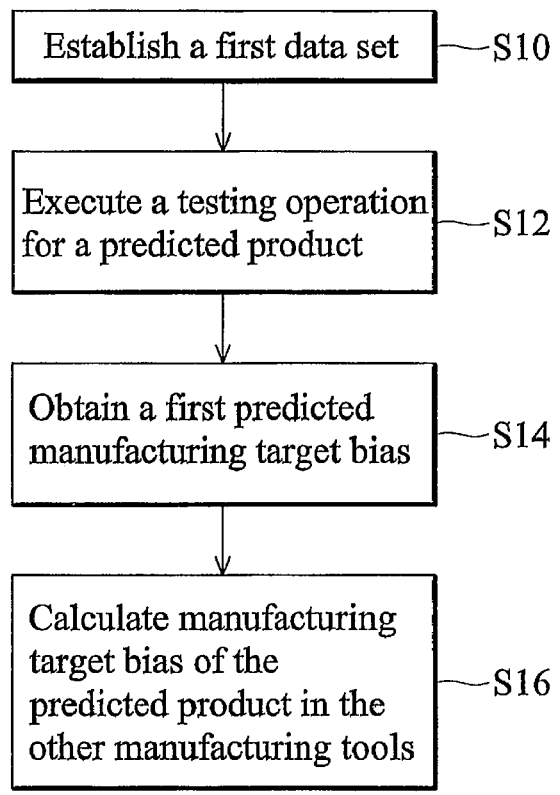
FIG. 2a is a flowchart of a computer implemented method for estimating manufacturing target bias for manufacture of the present invention.

FIG. 2a is a flowchart of a computer implemented method for estimating manufacturing target bias for manufacture of the present invention. First, a first data set is established according to manufacturing target bias history based on a correlation with tool used (step S10), following like manufacturing conditions of products in the manufacturing tools. The manufacturing tools comprise a first manufacturing tool and other manufacturing tools.

In one embodiment, the first data set can be implemented by a two-dimensional matrix. The two-dimensional matrix is established by the following formula:

$$d_{ij}[t] = \frac{\sum_{n=0}^{k} \{(1-w)^n \times d_{ij}[t-(n+1)]\}}{\sum_{n=0}^{k} (1-w)^n}$$

Here, w is a predetermined weight and k is a predetermined iteration count to express look back history. d is the manufacturing target bias history and may be present or historic. i is a raw number of the first data set, i.e. chambers, and j is a column number of the first data set, i.e. products. t is timing count.

Next, a testing operation is executed for a predicted product in the first manufacturing tool (step S12) to obtain a first predicted manufacturing target bias (step S14).

Finally, manufacturing target bias of the predicted product in the other manufacturing tools is calculated according to the first data set and the first predicted manufacturing target bias (step S16).

Figure 2B:
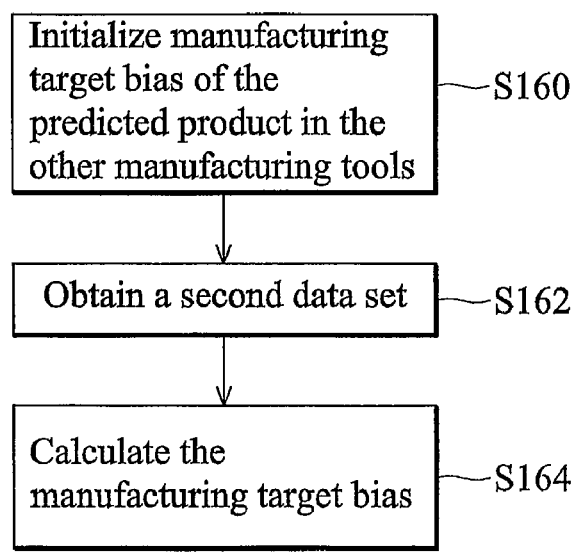
FIG. 2b is a detailed flowchart of the calculation of the manufacturing target bias of the present invention.

Step S16 in FIG. 2a is accomplished by the following steps, as shown in FIG. 2b, a detailed flowchart of the calculation of the manufacturing target bias of the present invention. First, manufacturing target bias for the predicted product in the other manufacturing tools is initialized according to the first predicted manufacturing target bias (step S160). In the embodiment, the manufacturing target bias of the predicted product in the other manufacturing tools is designated as the first predicted manufacturing target bias. A second data set is obtained according to the first data set, the first predicted manufacturing target bias, and the initialized manufacturing target bias (step S162). The manufacturing target bias of the predicted product in the other manufacturing tools is finally calculated according to the second data set (step S164). The second data set may be implemented as a two-dimensional matrix.

Figure 3:
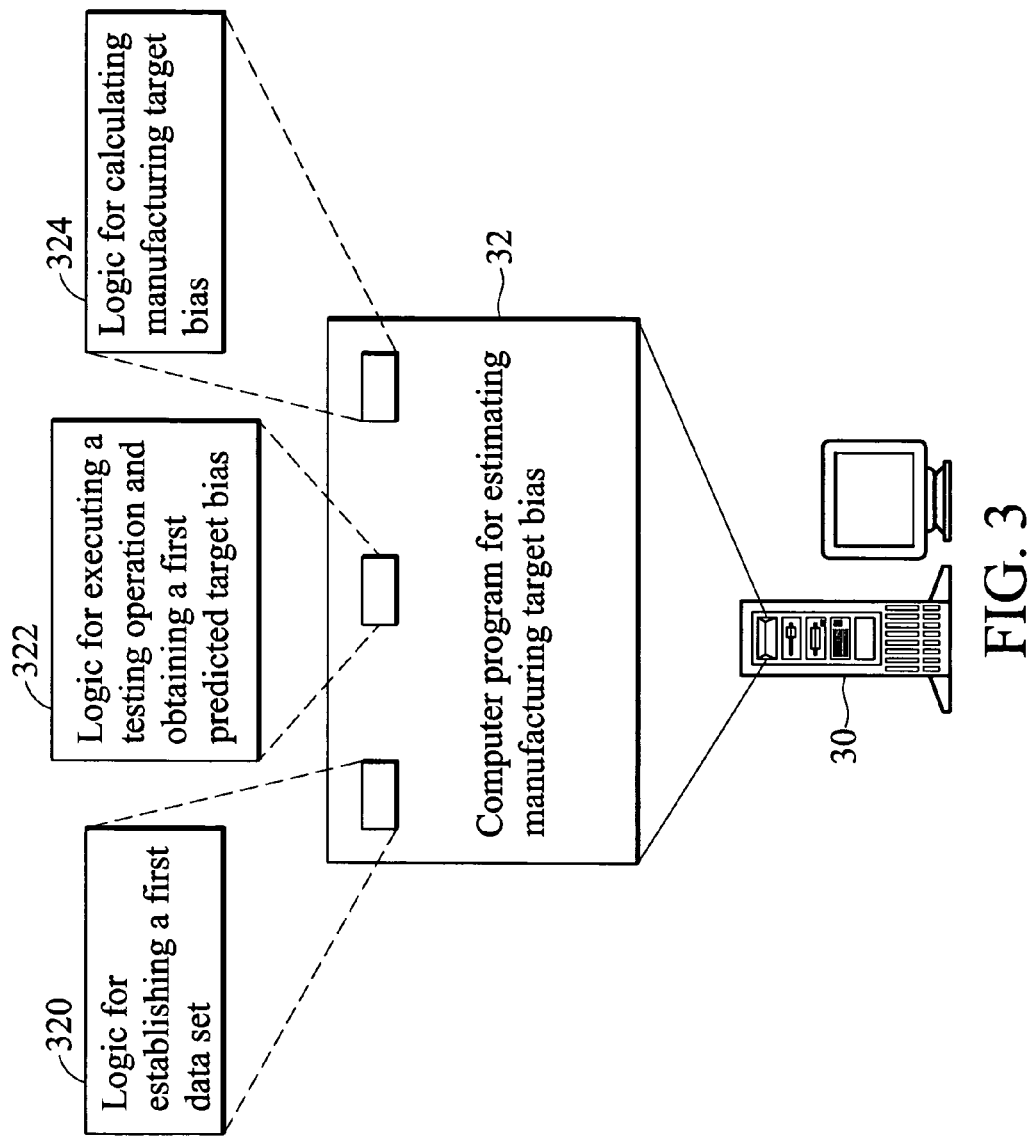
FIG. 3 is a diagram of a machine-readable storage medium for a computer program providing a method for estimating manufacturing target bias for manufacture.

FIG. 3 is a diagram of a machine-readable storage medium for a computer program providing a method for estimating manufacturing target bias for manufacture.

The present invention discloses a machine-readable storage medium 30 for storing a computer program 32 providing a computer implemented method for estimating manufacturing target bias for manufacture, comprising logic for establishing a first data set 320, logic for executing a testing operation and obtaining a first predicted target bias 322, and logic for calculating manufacturing target bias 324.

Figure 4A:
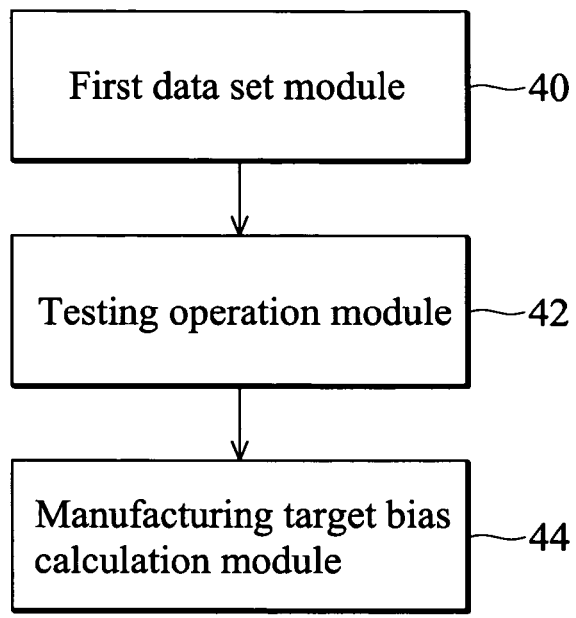
FIG. 4a is a diagram of a system for estimating manufacturing target bias for manufacture of the present invention.

FIG. 4a is a diagram of a system for estimating manufacturing target bias for manufacture of the present invention. A system for estimating manufacturing target bias for products in manufacturing tools is provided. In one embodiment, the system comprises a first data set module 40, a testing operation module 42, and a manufacturing target bias calculation module 44.

The first data set module 40 establishes a first dada set according to manufacturing target bias history based on a correlation with tools used. Here, the correlation applies to the same manufacturing conditions. The manufacturing tools comprise a first manufacturing tool and other manufacturing tools.

The first data set can be implemented by a two-dimensional matrix. The first data set is established using the following formula:

$$d_{ij}[t] = \frac{\sum_{n=0}^{k} \{(1-w)^n \times d_{ij}[t-(n+1)]\}}{\sum_{n=0}^{k} (1-w)^n}$$

Wherein W is a predetermined weight and k is a predetermined iteration count to express look back history. d is the manufacturing target bias history data, present or historical. i is a raw number of the first data set, j is a column number of the first data set, and t is timing count. If the two-dimensional matrix represents relationships of chambers and products, i may be chambers and j may be products.

The testing operation module 42 executes a testing operation of a first predicted product in the first manufacturing tool to obtain a first predicted manufacturing target bias.

The manufacturing target bias calculation module 44 calculates manufacturing target bias of the predicted product in the other manufacturing tools.

Figure 4B:
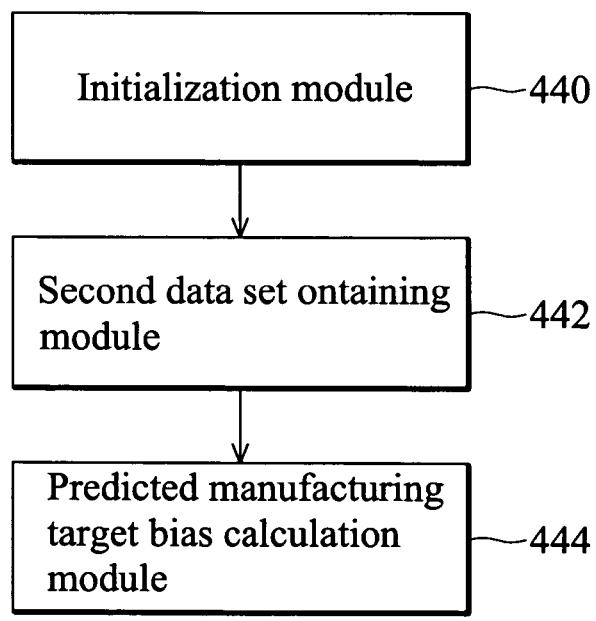
FIG. 4b is a detailed diagram of the manufacturing target bias calculation module of the present invention.

FIG. 4b is a detailed diagram of the manufacturing target bias calculation module of the present invention. The manufacturing target bias calculation module 44 comprises an initialization module 440, a second data set obtaining module 442, and a predicted manufacturing target bias calculation module 444.

The initialization module 440 initializes manufacturing target bias of the predicted product in the other manufacturing tools according to the first predicted manufacturing target bias. The initialization module 440 may designate the manufacturing target bias of the predicted product in the other manufacturing tools as the first predicted manufacturing target bias. The second data set obtaining module 442 calculates a second data set according to the first data set, the first predicted manufacturing target bias, and the initialized manufacturing target bias. The predicted manufacturing target bias calculation module 444 calculates the manufacturing target bias of the predicted product in the other manufacturing tools according to the second data set. The second data set can be implemented as a two-dimensional matrix.

The predicted manufacturing target bias calculation module 444 calculates the manufacturing target bias using the following formula $$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

Here, m is a sum of the product and the predicted product, n is the number of manufacturing tools, k is an iteration count to express look back history, i is a row number of the second data set, j is a column number of the second data set, and d is manufacturing target bias. Here, again, if the second data set, i.e. the two-dimensional matrix, represents relationships of chambers and products, i may be chambers and j may be products.

The predicted manufacturing target bias calculation module terminates the calculation if the predicted manufacturing target bias is less than a tolerance of the manufacturing tools.

Thus, a method for estimating manufacturing target bias for products in manufacturing tools is provided. The method estimates manufacturing target bias without executing testing operations for products in each manufacturing tool, especially for IC products, presenting significant improvement.

It will be appreciated from the foregoing description that the method and system described herein provide a dynamic and robust solution to the manufacturing process desired bias estimation problem. If, for example, the calculation formulas or the given initialized values are altered, the method and system of the present invention can be adjusted accordingly.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over a transmission medium, such as electrical wire, cable, fiberoptics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer implemented method for estimating manufacturing target bias for products in manufacturing tools, comprising the steps of:
    establishing a first data set according to manufacturing target bias history for the products based on a correlation with tools used, wherein the manufacturing tools comprise a first manufacturing tool and other manufacturing tools based on like manufacturing conditions;
    executing a testing operation for a predicted product in the first manufacturing tool to obtain a first predicted manufacturing target bias; and
    calculating manufacturing target bias of the predicted product in the other manufacturing tools according to the first data set and the first predicted manufacturing target bias, further comprising:
    initializing manufacturing target bias of the predicted product in the other manufacturing tools according to the first predicted manufacturing target bias;
    obtaining a second data set according to the first data set, the first predicted manufacturing target bias, and the initialized manufacturing target bias; and
    calculating the manufacturing target bias of the predicted product in the other manufacturing tools according to the second data set.

2. The computer implemented method of claim 1, wherein the first data set is enabled by a two-dimensional matrix.

3. The computer implemented method of claim 2, wherein the first data set is established using the following formula $$d_{ij}[t] = \frac{\sum_{n=0}^{k}\{(1-w)^n \times d_{ij}[t-(n+1)]\}}{\sum_{n=0}^{k}(1-w)^n}$$

wherein w is a predetermined weight, k is a predetermined iteration count to express look back history, d is the manufacturing target bias, i is a raw number of the first data set, j is a column number of the first data set, and t is timing count.

4. The computer implemented method of claim 1, wherein initialization designates the manufacturing target bias of the predicted product in the other manufacturing tools as the first predicted manufacturing target bias.

5. The computer implemented method of claim 1, wherein the second data set is enabled by a two-dimensional matrix.

6. The computer implemented method of claim 5, wherein calculation of the manufacturing target bias of the predicted product in the other manufacturing tools uses the following formula $$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

wherein m is a sum of the product and the predicted product, n is the number of manufacturing tools, k is an iteration count to express look back history, i is a row number of the second data set, j is a column number of the second data set, and d is manufacturing target bias.

7. The computer implemented method of claim 6, further comprising the steps of:
    determining if the calculated manufacturing target bias is less than a tolerance of the manufacturing tools; and
    terminating the calculation if the calculated manufacturing target bias is less than the tolerance of the manufacturing tools.

8. A machine-readable storage medium storing a computer program providing a method for estimating manufacturing target bias of products in manufacturing tools, the method comprising the steps of:
    establishing a first data set according to manufacturing target bias history for the products based on a correlation with tools used, wherein the manufacturing tools comprise a first manufacturing tool and other manufacturing tools based on like manufacturing conditions;
    executing a testing operation for a predicted product in the first manufacturing tool to obtain a first predicted manufacturing target bias; and
    calculating manufacturing target bias of the predicted product in the other manufacturing tools according to the first data set and the first predicted manufacturing target bias, further comprising:
    initializing manufacturing target bias of the predicted product in the other manufacturing tools according to the first predicted manufacturing target bias;
    obtaining a second data set according to the first data set, the first predicted manufacturing target bias, and the initialized manufacturing target bias; and calculating the manufacturing target bias of the predicted product in the other manufacturing tools according to the second data set.

9. The machine-readable storage medium of claim 8, wherein the first data set is enabled by a two-dimensional matrix.

10. The machine-readable storage medium of claim 9, wherein the first data set is established using the following formula $$d_{ij}[t] = \frac{\sum_{n=0}^{k}\{(1-w)^n \times d_{ij}[t-(n+1)]\}}{\sum_{n=0}^{k}(1-w)^n}$$

wherein w is a predetermined weight, k is a predetermined iteration count to express look back history, d is the manufacturing target bias, i is a raw number of the first data set, j is a column number of the first data set, and t is timing count.

11. The machine-readable storage medium of claim 8, wherein initialization is to designate the manufacturing target bias of the predicted product in the other manufacturing tools as the first predicted manufacturing target bias.

12. The machine-readable storage medium of claim 8, wherein the second data set is enabled by a two-dimensional matrix.

13. The machine-readable storage medium of claim 12, wherein calculation of the manufacturing target bias of the predicted product in the other manufacturing tools uses the following formula $$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

wherein m is a sum of the product and the predicted product, n is the number of manufacturing tools, k is an iteration count to express look back history, i is a row number of the second data set, j is a column number of the second data set, and d is manufacturing target bias.

14. The machine-readable storage medium of claim 13, further comprising the steps of:
determining if the calculated manufacturing target bias is less than a tolerance of the manufacturing tools; and
terminating the calculation if the calculated manufacturing target bias is less than the tolerance of the manufacturing tools.

15. A system for estimating manufacturing target bias for products in manufacturing tools, comprising:
a first data set module, establishing a first data set according to manufacturing target bias history for the products based on a correlation with tools used, wherein the manufacturing tools comprise a first manufacturing tool and other manufacturing tools based on like manufacturing conditions;
a testing operation module, coupled to the first data set module, executing a testing operation for a predicted product in the first manufacturing tool to obtain a first predicted manufacturing target bias;
a manufacturing target bias calculation module, coupled to the testing operation module, calculating manufacturing target bias of the predicted product in the other manufacturing tools according to the first data set and the first predicted manufacturing target bias;
an initialization module, initializing manufacturing target bias of the predicted product in the other manufacturing tools according to the first predicted manufacturing target bias;
a second data set obtaining module, coupled to the initialization module, obtaining a second data set according to the first data set, the first predicted manufacturing target bias, and the initialized manufacturing target bias; and
a predicted manufacturing target bias calculation module, coupled to the second data set obtaining module, calculating the manufacturing target bias of the predicted product in the other manufacturing tools according to the second data set.

16. The system of claim 15, wherein the first data set is enabled by a two-dimensional matrix.

17. The system of claim 16, wherein the first data set module uses the following formula to establish the first data set $$d_{ij}[t] = \frac{\sum_{n=0}^{k}\{(1-w)^n \times d_{ij}[t-(n+1)]\}}{\sum_{n=0}^{k}(1-w)^n}$$

wherein w is a predetermined weight, k is a predetermined iteration count to express look back history, d is the manufacturing target bias, i is a raw number of the first data set, j is a column number of the first data set, and t is timing count.

18. The system of claim 15, wherein the initialization module designates the manufacturing target bias of the predicted product in the other manufacturing tools as the first predicted manufacturing target bias for initialization.

19. The system of claim 15, wherein the second data set is enabled by a two-dimensional matrix.

20. The system of claim 19, wherein the predicted manufacturing target bias calculation module farther calculates the manufacturing target bias using the following formula $$d_{ij}[k+1] = \frac{m(n \times d_j[k] - d_{ij}[k]) + n(m \times d_i[k] - d_{ij}[k]) - (n \times m \times d[k] - d_{ij}[k])}{(n-1) \times (m-1)}$$

wherein m is a sum of the product and the predicted product, n is the number of manufacturing tools, k is an iteration count to express look back history, i is a row number of the second data set, j is a column number of the second data set, and d is manufacturing target bias.

21. The system of claim 20, wherein the prediction manufacturing target bias calculation module farther determines if the predicted manufacturing target bias is less than a tolerance of the manufacturing tools and terminates the calculation if the predicted manufacturing target bias is less than the tolerance of the manufacturing tools.

* * * * *